No. 772,689. PATENTED OCT. 18, 1904.
W. E. ALLINGTON.
APPARATUS FOR SEPARATING DUST FROM AIR.
APPLICATION FILED MAR. 14, 1904.
NO MODEL.

Witnesses
Edward R. Monroe.
Mary S. Tooker.

Inventor
William E. Allington
By Edward Taggart
Attorney

No. 772,689. Patented October 18, 1904.

UNITED STATES PATENT OFFICE.

WILLIAM E. ALLINGTON, OF SAGINAW, MICHIGAN.

APPARATUS FOR SEPARATING DUST FROM AIR.

SPECIFICATION forming part of Letters Patent No. 772,689, dated October 18, 1904.

Application filed March 14, 1904. Serial No. 198,139. (No model.)

*To all whom it may concern:*

Be it known that I, WILLIAM E. ALLINGTON, a citizen of the United States, residing at Saginaw, in the county of Saginaw and State of Michigan, have invented a new and useful Apparatus for Separating Dust from Air, of which the following is a specification.

This invention relates to a new and novel device for separating dust from dust-laden air by means of the rotation of the dust-laden air under conditions and within a suitable receptacle hereinafter described and the delivery of the purified air into the atmosphere with the least possible retarding influence; and the invention consists in the combination and arrangement of parts hereinafter particularly described and claimed.

The objects of my invention are, first, to produce a superior dust-collector for separating the dust from the air by means of a rotary or centrifugal motion of the dust-laden air within the chamber; second, to prevent back pressure upon the fan or fans producing the air-currents which give the rotary motion in the dust-separating chamber; third, to secure the highest efficiency possible from the rotary movement of the air for separating the dust; fourth, to maintain as near initial velocity of the entering air-current as possible to the point of free delivery; fifth, to devise a means into which existing dust-collectors can be easily and cheaply converted; sixth, to secure a positive and easy flow of the air from the dust-discharge opening for use in furnace-feeding where the dust is to be burned; seventh, other objects hereinafter described and claimed. These objects I accomplish by means of the mechanism illustrated in the accompanying drawings, in which—

Figure 1:
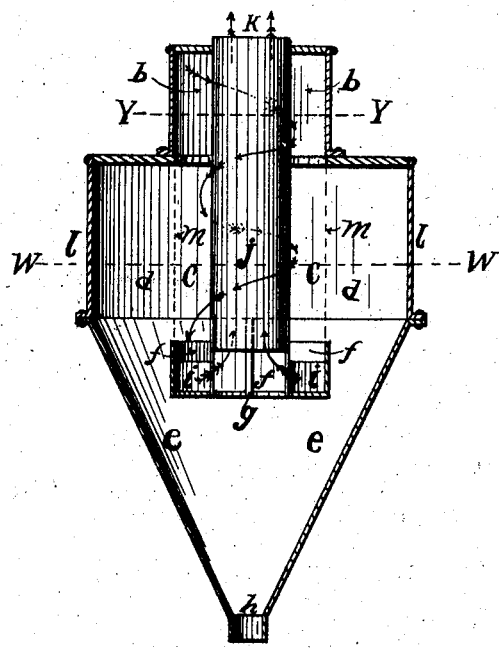
Figure 3:
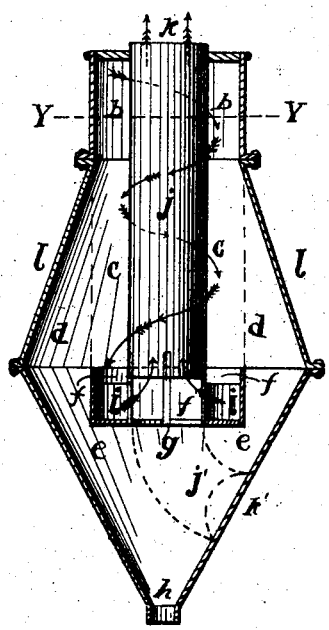
Figure 2:
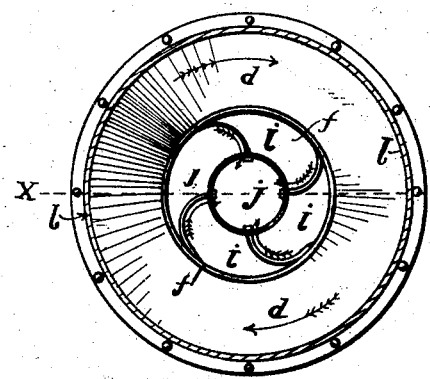
Figure 4:
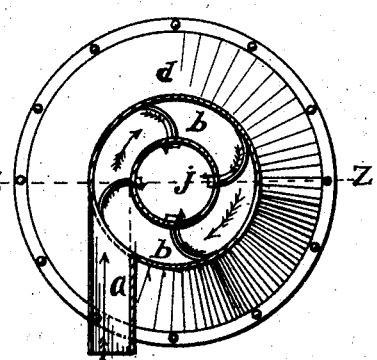

Figure 1 shows one of the old forms of centrifugal dust-separators modified to adapt the same to be operated in accordance with my invention. Fig. 2 shows a cross-section on the line W W of Fig. 1. Fig. 3 shows an elevation, partly in section, of my preferred form of device for separating dust from air. Fig. 4 shows a cross-section on the line Y Y of Fig. 1 or Fig. 3, the form of the two figures being precisely alike in cross-section.

Similar letters refer to similar parts throughout the several views.

In a general way my dust-separator is composed, preferably, of three chambers, the upper chamber adapted to receive the dust-laden air and to give to the dust-laden air its initial rotary velocity. This chamber should be as small as compatible with the capacity of the apparatus in order to give the dust-laden air as great a revolving motion as possible. The second chamber is larger than the first one and receives the dust-laden air from the first chamber, the dust-laden air being directed in a cylindrical spiral centrally through the larger chamber. The third chamber consists of one preferably conical in form, its upper end being preferably of the same size as chamber No. 2.

Extending down through chamber No. 1 and nearly through chamber No. 2 is a cylindrical pipe which serves for discharging the purified air after the dust has been separated therefrom. In the drawings I have shown two forms—one a form which shows how easily old machines may be converted, and illustrated by Fig. 1, and one the form which I prefer, which is illustrated by Fig. 3.

I will now proceed to describe more in detail the invention as illustrated by the drawings.

$b$ represents the upper section or chamber, which receives the air driven into it by a fan or other suitable means through an opening, as $a$. This chamber $b$ is placed above preferably a larger chamber, (shown by $l$,) the lower end of the chamber $b$ opening freely into chamber $l$. Chamber $l$ is preferably considerably larger in cross-section than chamber $b$ and is supported by or secured to a chamber $e$, which is preferably conical in shape. The discharge-pipe $j$, as shown in Figs. 1 and 3, is cylindrical in form and extends from the upper end of chamber $b$ down and nearly through the chamber $e$. The dust-laden air being forced into the chamber $b$ with great velocity is revolved rapidly and passes downward in a cylindrical spiral, revolving axially around the discharge-pipe $j$, the greater velocity being within a zone of substantially the same circumference as the circumference of the chamber $b$, the lines indicating the zone being shown by $m\,m$, thus leaving a zone (shown by $c\,c$) of greater velocity and an outer zone (shown by $d\,d$) of lesser velocity.

$f$ shows an annular guard, which annular guard is preferably made in the form of a chamber suspended below the lower end of the discharge-pipe $j$ and having an opening $g$ through the center of its bottom, as shown in Figs. 1 and 3. Within the said guard or above the bottom thereof I provide a series of deflectors $i$, arranged as shown in Fig. 2, said deflectors being placed within the cylindrical walls of $f$ and directing the air into the center under the discharge-pipe $j$. When the guard is merely an annular disk, the deflectors are placed above the disk in close proximity thereto. The portion of the air which does not pass into the discharge-pipe $j$ is carried down into the conical chamber and can pass freely up through the opening in the lower end of the discharge-pipe $j$, while the dust which is separated from the air will pass down along the inner walls of the chamber $l$ and $e$ and finally escape at the opening $h$. The deflectors $i$ are so placed as to destroy the rotary movement of the air and cause the same to flow freely into the discharge-pipe $j$. The chamber $f$ is open at the top and closed at the bottom and is preferably of about the same diameter as the chamber $b$, so that the air which has received its rotary motion in the chamber $b$ will pass down in a cylindrical spiral until the greater portion is arrested by the chamber $f$ and will pass into the discharge-pipe $j$ and escape through the opening $k$ at the top. By this construction the air is not retarded by centrifugal force in passing into and out of the dust-separating apparatus. During the course of the centrally-rotating air-body within the dotted lines shown by $m$ the centrifugal force has thrown the dust into the surrounding air-body (represented by $d$) and against the surface of the walls of the middle section, where it travels in a thin layer in spiral lines downward and delivers the same into the lower section $e$. Traveling through this cone-shaped chamber, on its inner surface, it is delivered to the discharge-opening $n$; but inasmuch as the initial velocity is given to the air within the small cylindrical section $b$ this initial velocity, as was stated, will continue downward axially until it is arrested by the chamber $f$, as above described.

If desired, the discharge-pipe $j$ may be omitted and a pipe continued downwardly, as shown in the dotted lines in Fig. 3 by $j''$, having an opening at $k'$, in which case the air may be discharged at the bottom through the discharge-pipe $j''$ at the point $k'$ instead of at the top at the point $k$, the top being solid.

Among the many advantages of this form of construction of a dust-arrester are the following: The air being taken into the air-escape pipe from the zone of rapid rotation of the air, and substantially at the bottom thereof, through a discharge device of practically the same diameter as the zone of rapid rotation prevents any back pressure or any obstacle to a free flow of the air into and out of the said discharge-pipe, the arrangement of the deflectors $i$ being such that the centrifugal force of the air is substantially destroyed without obstructing its free passage. Another substantial advantage is that the dust particles are thrown readily from the more rapidly revolving column into the less rapidly revolving column, so that the air taken from the more rapidly revolving column is more thoroughly purified. By separating the air into two columns of different rotation and taking the greater portion of the air from the more rapidly revolving column into the air-discharge pipe and allowing a portion thereof to flow into the less rapidly revolving column, thence into the cone-shaped lower chamber, I am enabled to control the discharge of the dust through the opening $h$ so as to give just enough air-pressure to feed the dust, shavings, &c., to a furnace in the most efficient and economical manner.

Having thus described my invention, what I claim to have invented, and desire to secure by Letters Patent of the United States, is—

1. A dust-separator involving a receptacle having a dust-outlet, one end of said receptacle being of smaller diameter than the remainder and provided with a tangentially-arranged inlet communicating with a dust-laden air-supply, said smaller portion of said receptacle in connection with said inlet adapted to create in the larger portion of said receptacle a rapidly-rotating central column of dust-laden air within a body of air containing the separated dust and rotating unobstructedly at less velocity with respect to the column of air, and means arranged within the larger portion of the receptacle and of a diameter substantially as great as the central column of dust-laden air for arresting the rotation of and deflecting the purified air from one end of the central column causing thereby the continuous discharge of such air from the receptacle.

2. A dust-separator involving a lower chamber, an upper chamber of less diameter than said lower chamber into which it opens, said upper chamber having a tangentially-arranged inlet communicating with a dust-laden air-supply and in connection with said inlet adapted to create in said lower chamber a rapidly-rotating central column of dust-laden air within a body of air rotating at less velocity with respect to the column of air, and means arranged within said lower chamber and of a diameter substantially as great as the diameter of said upper chamber for arresting the rotation of and deflecting the air from one end of the column of air after the dust has been separated therefrom, causing thereby the discharge of the purified air from the lower chamber.

3. A dust-separator involving a lower chamber, an upper chamber of less diameter than said lower chamber into which it opens, said upper chamber having a tangentially-arranged inlet communicating with a dust-laden air-supply and in connection with said inlet adapted to create in said lower chamber a rapidly-rotating central column of dust-laden air within a body of air rotating at less velocity with respect to the column of air, and a plurality of combined arresters and deflectors arranged within said lower chamber and of a diameter substantially as great as the diameter of said upper chamber for arresting the rotation of and deflecting the air from one end of the column of air after the dust has been separated therefrom, causing thereby the discharge of the purified air from the lower chamber.

In testimony whereof I have hereunto set my hand in presence of two subscribing witnesses.

WILLIAM E. ALLINGTON.

Witnesses:
 FOREÉ BAIN,
 GEO. T. MAY, Jr